United States Patent
Jun

(10) Patent No.: US 7,542,772 B2
(45) Date of Patent: Jun. 2, 2009

(54) METHOD FOR STORING SHORT MESSAGE SERVICE IN A MOBILE COMMUNICATION TERMINAL

(75) Inventor: Sung-Woo Jun, Gyongki-Do (KR)

(73) Assignee: LG Electronics Inc., Seoul (KR)

( * ) Notice: Subject to any disclaimer, the term of this patent is extended or adjusted under 35 U.S.C. 154(b) by 171 days.

(21) Appl. No.: 10/704,630

(22) Filed: Nov. 12, 2003

(65) Prior Publication Data

US 2004/0132469 A1 Jul. 8, 2004

(30) Foreign Application Priority Data

Nov. 12, 2002 (KR) .................. 10-2002-0070153

(51) Int. Cl.
 *H04W 4/00* (2006.01)
(52) U.S. Cl. .................. 455/466; 455/412.1; 455/558
(58) Field of Classification Search .................. 455/466, 455/412.1, 425, 550.1, 558
 See application file for complete search history.

(56) References Cited

U.S. PATENT DOCUMENTS

| | | | | |
|---|---|---|---|---|
| 4,882,475 A | * | 11/1989 | Miller et al. | 235/383 |
| 5,687,216 A | * | 11/1997 | Svensson | 455/412.2 |
| 5,930,239 A | * | 7/1999 | Turcotte | 370/310 |
| 6,175,743 B1 | | 1/2001 | Alpervoich et al. | |
| 6,333,973 B1 | * | 12/2001 | Smith et al. | 379/88.12 |
| 2001/0049279 A1 | * | 12/2001 | Vermelle et al. | 455/419 |
| 2004/0137884 A1 | * | 7/2004 | Engstrom et al. | 455/414.1 |

FOREIGN PATENT DOCUMENTS

WO  WO 02/09460 A1  1/2002

OTHER PUBLICATIONS

KR Office Action dated Feb. 4, 2005.
Office Action issued by the Patent Office of the People's Republic of China on May 20, 2005 (English full text and Chinese Full Text).

* cited by examiner

*Primary Examiner*—George Eng
*Assistant Examiner*—Marcos L Torres
(74) *Attorney, Agent, or Firm*—KED & Associates, LLP

(57) ABSTRACT

A method for storing short message service in a mobile communication terminal, in which a new received SMS is stored at a user identity module (UIM) by performing a space exchange between a SMS storage space of the terminal and a SMS storage space of the UIM in a CDMA terminal having the UIM. The method includes: if the SMS is received, checking whether an empty region exists in a SMS storage space of the UIM or not; if an empty region does not exist, performing a space exchange between the SMS storage spaces of the terminal and the UIM; and storing a new SMS in the empty SMS storage space of the UIM generated by the space exchange.

11 Claims, 4 Drawing Sheets

FIG. 1

| 0 | 1 | 2 | | N-1 |
|---|---|---|---|---|
| LIST_CAT | LIST_CAT | LIST_CAT | ... | LIST_CAT |
| ORDER_IDX | ORDER_IDX | ORDER_IDX | | ORDER_IDX |

FIG. 2

|   | | 0 | 1 | | N-1 |
|---|---|---|---|---|---|
| 0 | CNT | NV_IDX | NV_IDX | ... | NV_IDX |
| 1 | CNT | NV_IDX | NV_IDX | ... | NV_IDX |
| ⋮ | | | | | |
| L-1 | CNT | NV_IDX | NV_IDX | ... | NV_IDX |

0: AVAIL
1: URGENT NOT READ
2: NORMAL NOT READ
3: READ
4: VOICE MAIL

FIG. 4

| LIST GENERATION | | NEW RECEPTION 1 | | NEW RECEPTION 2 | | NEW RECEPTION 3 | | NEW RECEPTION 4 | | NEW RECEPTION 5 | |
|---|---|---|---|---|---|---|---|---|---|---|---|
| OFFSET | STATE | OFFSET | STATE | OFFSET | STATE | OFFSET | STATE | OFFSET | STATE | OFFSET | STATE |
| 4 | AVAIL | 8 | AVAIL | 9 | AVAIL | 10 | AVAIL | 10 | NEW U | 10 | NEW U |
| 8 | AVAIL | 9 | AVAIL | 10 | AVAIL | 2 | NEW U | 3 | NEW U | 3 | NEW U |
| 9 | AVAIL | 10 | AVAIL | 2 | NEW U | 3 | NEW U | 1 | NEW U | 1 | NEW U |
| 10 | AVAIL | 2 | NEW U | 3 | NEW U | 1 | NEW U | 4 | NEW U | 4 | NEW U |
| 2 | NEW U | 3 | NEW U | 1 | NEW U | 4 | NEW U | 5 | NEW U | 5 | NEW U |
| 3 | NEW U | 1 | NEW U | 4 | NEW U | 5 | NEW U | 7 | NEW | 7 | NEW |
| 1 | NEW U | 4 | NEW U | 7 | NEW | 7 | NEW | 9 | NEW | 9 | NEW |
| 7 | NEW | 7 | NEW | 5 | NEW | 9 | NEW | 2 | NEW | 2 | NEW |
| 6 | READ | 6 | READ | 6 | READ | 6 | READ | 6 | READ | 6 | READ |
| 5 | READ | 5 | READ | 8 | READ | 8 | READ | 8 | READ | 8 | READ |

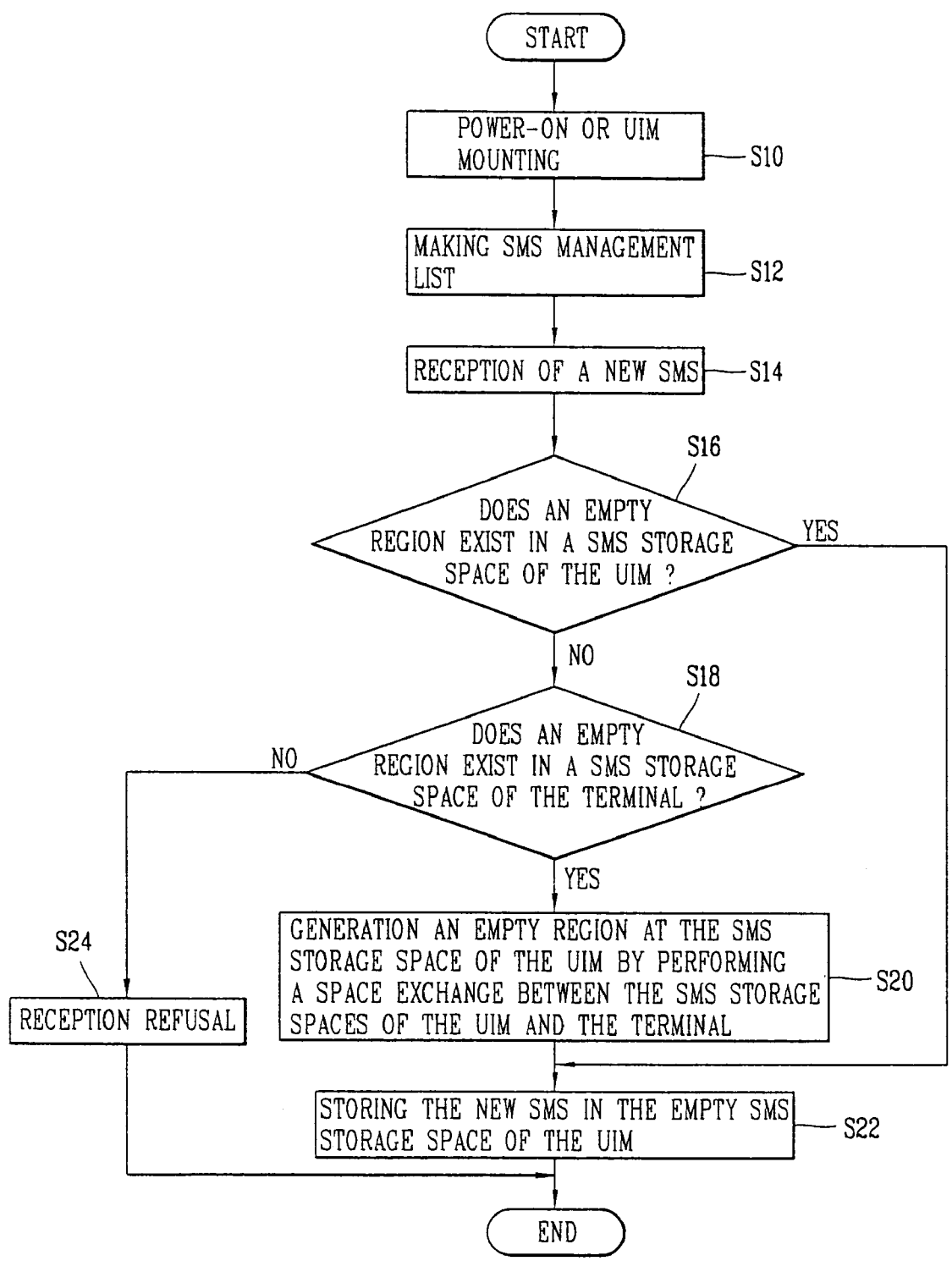

METHOD FOR STORING SHORT MESSAGE SERVICE IN A MOBILE COMMUNICATION TERMINAL

BACKGROUND OF THE INVENTION

1. Field of the Invention

The present invention relates to a mobile communication terminal to which a user identity module (UIM) is attached, and more particularly, to a method for storing a short message service (SMS) in the UIM.

2. Background of the Related Art

Generally, a user identity module (UIM) is a card used in a CDMA terminal, on which characteristics of an IC card has (such as a portable characteristic, a storage characteristic, and a certification algorithm) are grafted. The UIM is similar to a subscriber identity module (SIM) used in a global system for mobile communication (GSM) terminal, so that it is also called as CDMA SIM.

The UIM is composed of a microprocessor and a memory chip. In the memory chip, the UIM owner's personal information and all kinds of information for operating the terminal (telephone numbers and network numbers) are stored. Therefore, a user can be provided with a wanted call service by mounting his UIM to another terminal which supports a SIM interface.

A CDMA terminal to which the UIM card is attached is not shown. Accordingly, if the SMS is received, the related art CDMA terminal generally stores the received SMS to a SMS storage region provided at an inner memory. However, if the SMS storage region is filled, the related art CDMA terminal can not store another SMS additionally received.

Also, management and exchange structures for the SMS between the current CDMA terminal and the UIM are not defined. Therefore, when the CDMA terminal having the UIM card is shown in future, the SMS is not effectively stored.

SUMMARY OF THE INVENTION

One exemplary embodiment of the present invention is to provide management and exchange structures for short message service (SMS) between a terminal and a UIM in a CDMA terminal having the UIM.

Another embodiment of the present invention is to provide a method for storing SMS more effectively by selectively moving the SMS stored in the UIM to an inner memory of the CDMA terminal.

To achieve these and other advantages and in accordance with the purpose of the present invention, as embodied and broadly described herein, there is provided a method for storing SMS in a mobile communication terminal, the method comprising the steps of: if the SMS is received, checking whether an empty region exists in a SMS storage space of the UIM or not; if an empty region does not exist, performing a space exchange between a SMS storage space of the terminal and the SMS storage space of the UIM; and storing a new SMS in an empty SMS storage space of the UIM generated by the space exchange.

To achieve these and other advantages and in accordance with the purpose of the present invention, as embodied and broadly described herein, there is also provided a method for storing SMS in a mobile communication terminal, the method comprising the steps of: generating a SMS management list by respectively reading the storage spaces of the terminal and a subscriber identity module; if the SMS is received, checking whether an empty region exists in the SMS storage space of the UIM or not with reference to the SMS management list; if an empty region does not exist, checking whether an empty region exists in the SMS storage space of the terminal; if an empty region exists in the SMS storage space of the terminal, performing a space exchange between the SMS storage spaces of the terminal and the UIM; and storing a new SMS in the SMS storage space of the UIM generated by the space exchange.

Another embodiment of the present invention is for storing a message in a mobile communication terminal. If the message is received, checking whether an empty region exists in a message storage space of a module storing user information. If an empty region does not exist, performing a space exchange between a message storage space of the terminal and a message storage space of the module storing user information. A new message is stored in the empty message storage space of the module storing user information generated by the space exchange.

Another embodiment of the present invention is a message in a mobile communication terminal including generating a message management list by respectively reading message storage spaces of the terminal and a module storing user information. If the message is received, checking whether an empty region exists in the message storage space of the module storing user information or not with reference to the message management list. If an empty region does not exist, checking whether an empty region exists in the message storage space of the terminal or not. If an empty region exists in the message storage space of the terminal, performing a space exchange between the message storage spaces of the terminal and the module storing user information and storing a new message in the message storage space of the module storing user information generated by the space exchange.

Another embodiment of the present invention is an apparatus that stores a message in a mobile communication terminal including generating a message management list by respectively reading message storage spaces of the terminal and a module storing user information. If the message is received, checking whether an empty region exists in the message storage space of the module storing user information or not with reference to the message management list. If an empty region does not exist, checking whether an empty region exists in the message storage space of the terminal or not. If an empty region exists in the message storage space of the terminal, performing a space exchange between the message storage spaces of the terminal and the module storing user information and storing a new message in the message storage space of the module storing user information generated by the space exchange.

Additional advantages and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

The accompanying drawings, which are included to provide a further understanding of the invention and are incorporated in and constitute a part of this specification, illustrate embodiments of the invention and together with the description serve to explain the principles of the invention.

In the drawings:

FIG. 1 shows a SMS management structure according to the present invention;

FIG. 2 shows a SMS management structure by kinds according to the present invention;

FIG. 3 shows an example for managing SMS stored in the terminal and the UIM;

FIG. 4 shows an example of a space exchange between the terminal and the UIM; and FIG. 5 shows an exemplary method for storing SMS in a mobile communication terminal according to the present invention.

DETAILED DESCRIPTION OF PREFERRED EMBODIMENTS

Figure 3:
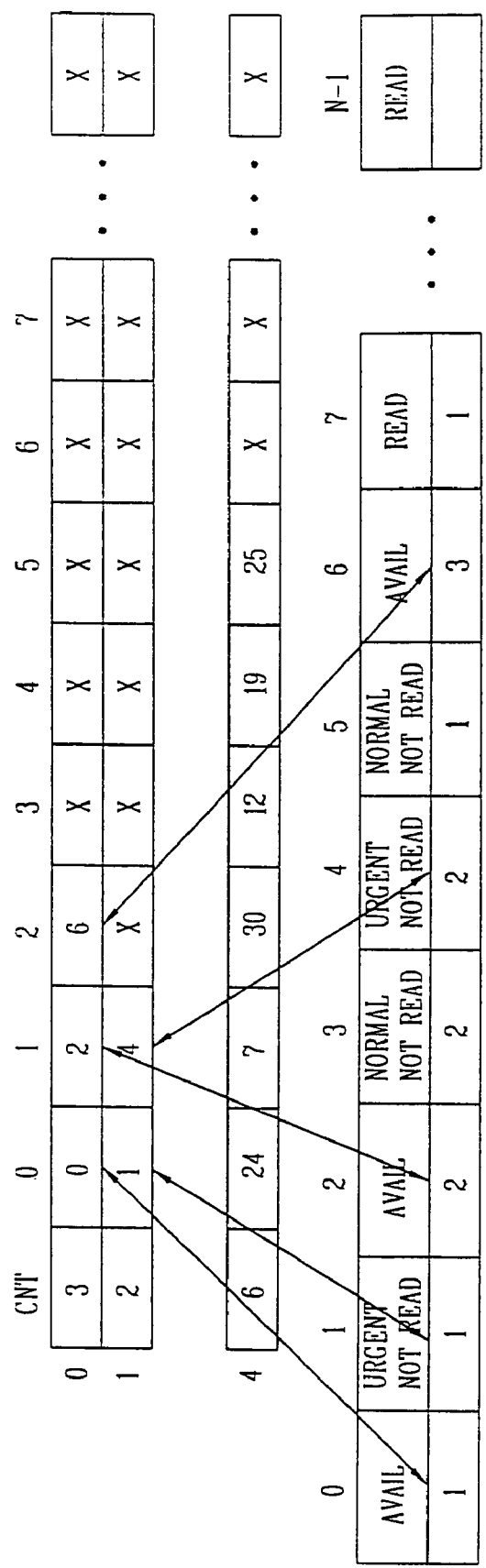

Generally, inner memories of a CDMA terminal and a UIM are respectively provided with a storage region for storing SMS. The SMS storage space of the UIM is composed of plural records. The 1 record is composed of a state bit of 1 byte, a size bit of 1 byte, and a data bust message of 253 byte. A storage capacity of the 1 record is 255 byte/message. At this time, the state bit displays a state of a stored SMS such as a free message, a read received message (MT Read), a received message which is not read (MT nor Read), a transmitted sent message (MO Sent), and a sent message which is not transmitted (MO not Sent). Also, an additional SMS storage space exists in the CDMA terminal, and only state information of the SMS stored in the UIM is stored at the corresponding space.

In one exemplary embodiment of the present invention, a SMS management and exchange structure between the CDMA terminal and the UIM is provided. An SMS management list and a management list by kinds of the message are provided at the inner memory of the terminal.

FIG. 1 shows a SMS management structure according to one embodiment the present invention. As shown in FIG. 1, the SMS management structure is composed of a list category (list_cat) representing kinds (Urgent Not Read, Normal Not Read, Read, Voice Mail, Avail) of a stored message, and an order index (order_idx) representing a reception order of the stored message by the kinds. At this time, 0, 1 . . . n–1 represent memory offset addresses, and a maximum offset address can be changed by a model of the CDMA terminal.

FIG. 2 shows a SMS management structure by type according to one embodiment of the present invention. As shown in FIG. 2, the message management structure by kinds is composed of a count value (cnt) showing a total number of the messages by kinds, and a memory index (nx_idx) showing an offset address of a region in which a corresponding message is stored. At this time, 0, . . . L–1 of the axis of ordinates represent kinds of the messages.

Accordingly, as shown in FIG. 3, a storage state of the SMS stored at the inner memory of the CDMA or the UIM can be easily understood from the message management structures.

That is, storage regions of 0, 2, and 6 (offset address) are now empty, two urgent not read messages are stored in the storage regions of 1 and 4, and 6 voice mails are stored in the storage regions of 24, 7, 30, 12, 19, and 25. Also, as shown in FIG. 3, three normal not read messages are stored in the storage regions of 3 and 5, and 12 read messages are stored in 7 and N–1.

A method for exchanging the SMS in the CDMA terminal having the UIM will be explained. If a power is turned on or a new UIM is mounted, the CDMA terminal (will be abbreviated as a terminal) reads the SMS stored at the inner memory of the terminal and the UIM and generates an SMS management list.

That is, the terminal stores a state and an offset address of the SMS by sequentially reading the SMS storage space of the UIM, and stores a state and an offset address of the SMS by reading the inner memory of the terminal.

At this state, if a new SMS is received, the terminal certifies the SMS management list and checks whether an empty region where the SMS is not stored exists or not. As a result of the check, if an empty region exists, a new SMS is stored at a corresponding region, and if an empty region does not exist, a space exchange is performed between the inner memory of the terminal and the storage space of the UIM, and the new SMS is stored at the storage space of the UIM.

That is, the SMS stored in the UIM is moved to the inner memory of the terminal according to preferential orders, thereby generating an empty region in the UIM and then storing the new SMS in the empty region. At this time, the preferential orders are as follows: Read<New<New U.

The process will be explained with reference to FIG. 4. In one exemplary embodiment, if the inner memory of the terminal has a storage capacity of 5 files (offset address 6 to offset address 10), and the storage space of the UIM has a storage capacity of 5 storage spaces (offset address 1 to offset address 5), the terminal can make an SMS management list such as that shown in FIG. 4 by reading the two storage spaces. At this time, in the SMS management list, a state of the avail is aligned by an ascending order regardless of the inner memory and the storage space of the UIM. States of the New U, the New and the Read are aligned as an ascending order according to storage orders.

Also, in the SMS management list, the New U represents an urgent message which is not read, the New represents a normal message which is not read, the Read represents a read message, and the Avail represents an empty region. The New U and the New are used for convenience of explanation only, and those skilled in the art will appreciate that the present invention is not limited to these representations.

At this state, if the new SMS (New U) is received (new reception 1), the terminal certifies the SMS storage space of the UIM and checks whether an empty region where the SMS is not stored exists or not. As a result of the check, if an empty region (e.g., Avail: offset address 4) exists in the UIM, the terminal stores the New U in a corresponding space (offset address 4).

Subsequently, if a new SMS is received again (new reception 2), since an empty region for storing the new SMS does not currently exist in the storage space of the UIM, the terminal moves the Read messages having the lowest preferential order to an empty region (e.g., Avail : offset address 8) of the inner memory of the terminal and then stores the New at the storage space of the UIM (e.g., offset address 5) where the previous Read messages are stored. At this time, the Avail of the new SMS is aligned as an ascending order in the SMS management list, and in case of the New U, the New, and the Read, a new message is located behind the messages previously received.

Then, if a new SMS (New U) is received (a new reception 3), since an empty region for storing the new SMS does not currently exist in the storage space of the UIM and the SMS having the lowest preferential order is the New, the terminal moves the new messages to an empty region (e.g., Avail : offset address 9) of the inner memory of the terminal and then stores the New U at the storage space of the UIM (e.g., offset address 5) where the New message is previously stored.

Subsequently, if the new SMS is received (a new reception 4), since the SMS having the lowest preferential order is only New U among the SMS stored in the UIM, the terminal moves the New U message stored for the first time to an empty region (e.g., Avail: offset address 10) of the terminal and then stores the New at the storage space of the UIM (e.g., offset address 2) where the New U is previously stored.

At this state, if a new SMS is again received, storage spaces of the terminal and the UIM are filled up, thereby not being able to store the new SMS in the UIM any longer. Accordingly, the terminal refuses to receive the SMS.

FIG. 5 is a flow chart showing an exemplary method for storing SMS in a mobile communication terminal having the UIM in accordance with one embodiment of the present invention. As shown in FIG. 5, if a power is turned on or the UIM is mounted at the terminal (S10), the terminal generates a SMS management list by reading the SMS stored in the storage spaces of the terminal and the UIM (S12).

Then, if a new SMS is received (S14), the terminal checks whether an empty region exists in the SMS storage space of the UIM or not with reference to the SMS management list (S16). As a result of the check, if an empty region exists, a new SMS is stored at the SMS storage space of the UIM and a state of a corresponding storage space (record) is changed (S22).

In the meantime, if an empty region does not exist, the terminal checks whether an empty region exists in the SMS storage space of the terminal or not (S18). At this time, if an empty region exists, a space exchange between the SMS storage spaces of the terminal and the UIM is performed, thereby generating an empty region at the SMS storage space of the UIM (S20). That is, the terminal moves the SMS having the lowest preferential order among the SMS stored at the SMS storage space of the UIM to the SMS storage space of the terminal, and generates an empty region at the SMS storage space.

Accordingly, the terminal stores the new SMS at the SMS storage space of the UIM and then changes a state of its corresponding storage space. In the meantime, if an empty region does not exist at the SMS storage space of the terminal, the terminal rejects the reception of the new SMS (S24).

Even though only a CDMA terminal is explained in the detailed description, the present invention can also be applied to a new SMS storage for SIM used at the terminal of the GSM method. Exemplary embodiments of the present invention will efficiently store the new received SMS to the UIM by performing a space exchange between the storage spaces of the terminal and the UIM.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for storing short message service (SMS) in a mobile communication terminal comprising: when a new SMS is received, checking whether an empty region exists in a SMS storage space of a user identity module (UIM) or not; when an empty region does not exist in the SMS storage space of the UIM, performing a space exchange between a SMS storage space of the terminal and the SMS storage space of the UIM; and storing the new SMS in the empty SMS storage space of the UIM generated by the space exchange, wherein performing the space exchange includes: when an empty region does not exist in the SMS storage space of the UIM, checking whether an empty region exists in the SMS storage space of the terminal or not; when an empty region exists in the SMS storage space of the terminal, reviewing a state and an offset address of a plurality of SMS messages in a SMS management list to determine a SMS having a lower preferential order among the SMS stored at the UIM, the preferential order from lowest to highest comprising read SMS, new unread SMS, and new unread urgent SMS; and moving the determined SMS having the lower preferential order to the SMS storage space of the terminal and then generating an empty region at the SMS storage space of the UIM, and wherein a new SMS is refused and not received if all storage spaces of the terminal and all storage spaces of the UIM are filled up, wherein the reviewed SMS management list includes information related to at least one SMS having a read status, information related to at least one SMS having an unread status and information related to at least one SMS having a new unread urgent status.

2. The method of claim 1, wherein the UIM is an IC card used at CDMA or GSM terminals.

3. A method for storing a message in a mobile communication terminal comprising: generating a short message service SMS message management list by respectively reading storage spaces of the terminal and a module storing user information, the management list containing information related to at least one of read status or unread status of each message, urgency of each storage space availability, and storage space location of each message; when a new message is received, checking whether an empty region exists in the storage space of the module storing user information or not with reference to the message management list; when an empty region does not exist in the module, checking whether an empty region exists in the storage space of the terminal or not; when an empty region exists in the storage space of the terminal, performing a space exchange between the storage spaces of the terminal and the module storing user information; and storing the new message in the storage space of the module storing user information generated by the space exchange, wherein the performing the space exchange comprises: when the empty region exists in the storage space of the terminal, determining from the SMS message management list a specific message having a lower preferential order and a lower offset value among the messages stored at the module, wherein the determining includes reviewing a state and an offset value of a plurality, of SMS messages in the SMS message management list; and moving the specific message having the lower preferential order and the lower offset value to the storage space of the terminal and then generating an empty region at the module, the preferential order from lowest to highest comprising read message, new unread message, and new unread urgent message, wherein the SMS management list includes information related to at least one SMS having a read status, information related to at least one SMS having an unread status and information related to at least one SMS having a new unread urgent status, and wherein a new message is refused and not received if all storage spaces of the terminal and all storage spaces of the module are filled up.

4. The method of claim 3, wherein the SMS management list is made whenever a power of the terminal is turned on or a new UIM is mounted to the terminal.

5. The method of claim 3, wherein the UIM is an IC card used at CDMA or GSM terminals.

6. The method of claim 3, wherein a state of availability is aligned in an ascending order regardless of the terminal and the UIM in the SMS management list.

7. The method of claim 3, wherein states of residual SMS except the availability are aligned in an ascending order by a storage order in the SMS management list.

8. The method of claim 3, wherein the new SMS is aligned by type behind the SMS previously received.

9. The method of claim 3, wherein said predetermined capacity equals a maximum capacity of the SMS storage space of the UIM.

10. The method of claim 3, wherein the UIM includes an IC card and the terminal is one of a CDMA or a GSM terminal.

11. An apparatus that stores a message in a mobile communication terminal comprising: a generator that generates a message management list by respectively reading storage spaces of the terminal and a module storing user information, the management list containing information related to at least one of read status or unread status of each message, urgency of each storage space availability, and storage space location of each message; a receiver that if a new message is received, checks whether an empty region exists in the storage space of the module storing user information or not with reference to the message management list, when an empty region does not exist in the module, checking whether an empty region exists in the storage space of the terminal or not, and when an empty region exists in the storage space of the terminal, performing a space exchange between the storage spaces of the terminal and the module storing user information; and a storage device that stores the new message in the storage space of the module storing user information generated by the space exchange, wherein the receiver performs the space exchange by: when the empty region exists in the storage space of the terminal, determining from the message management list a specific message having a lower preferential order and a lower offset value among the messages stored at the module, wherein the determining includes reviewing a state and an offset value of a plurality of SMS messages in the SMS message management list; and moving the specific message having the lower preferential order and the lower offset value to the storage space of the terminal and then generating an empty region at the module, the preferential order from lowest to highest comprising read message, new unread message, and new unread urgent message, wherein the SMS management list includes information related to at least one SMS having a read status, information related to at least one SMS having an unread status and information related to at least one SMS having a new unread urgent status, and wherein a new message is refused and not received if all storage spaces of the terminal and all storage spaces of the module are filled up.

* * * * *